(12) United States Patent
Kurokawa et al.

(10) Patent No.: US 7,920,306 B2
(45) Date of Patent: Apr. 5, 2011

(54) IMAGE READING APPARATUS

(75) Inventors: Naho Kurokawa, Inagi (JP); Hiroyuki Takahara, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 945 days.

(21) Appl. No.: 11/684,437

(22) Filed: Mar. 9, 2007

(65) Prior Publication Data

US 2007/0211313 A1    Sep. 13, 2007

(30) Foreign Application Priority Data

Mar. 13, 2006  (JP) .................................. 2006-067420
Apr. 19, 2006  (JP) .................................. 2006-115696

(51) Int. Cl.
*H04N 1/04* (2006.01)
(52) U.S. Cl. ......... 358/498; 358/474; 358/497; 358/488
(58) Field of Classification Search .................. 358/498, 358/474, 488, 497
See application file for complete search history.

(56) References Cited

U.S. PATENT DOCUMENTS

2003/0117670 A1* 6/2003 Brugger et al. ............... 358/474
2005/0094216 A1* 5/2005 Wu .............................. 358/474

FOREIGN PATENT DOCUMENTS

JP              11-27507 A          1/1999

* cited by examiner

*Primary Examiner* — Twyler L Haskins
*Assistant Examiner* — Michael Burleson
(74) *Attorney, Agent, or Firm* — Canon USA Inc IP Div

(57) ABSTRACT

An image reading apparatus enabling a user to flexibly select one of plural reading modes, for example, for continuously reading two-sided images of stacked document sheets or reading pages of a book or a large document exceeding a platen. In a first reading mode, a reading unit scans a document and reads a document image. In a second reading mode, a stationary reading unit and the reading unit read an image of a document fed from a document feeder section. The reading unit is provided in a flatbed reading section which is detachable from an apparatus body. The flatbed reading section, when detached from the apparatus body, can be used as a flatbed scanner.

13 Claims, 8 Drawing Sheets

IMAGE READING APPARATUS

BACKGROUND OF THE INVENTION

1. Field of the Invention

The present invention relates to an image reading apparatus having a document reading function, such as an image scanner, a facsimile machine, and a copying machine.

2. Description of the Related Art

Image scanners, facsimile machines, and copying machines can operate in various reading modes. FIG. 8 is a vertical cross-sectional diagram illustrating a conventional image reading apparatus. The image reading apparatus illustrated in FIG. 8 is an image scanner. The image scanner illustrated in FIG. 8 can operate in a first reading mode for reading an image of a document (i.e., original) P101 placed on a platen glass 101 and in a second reading mode for reading an image of each document (i.e., original) P102 stacked on a document feeder tray 103.

In the first reading mode, a driving unit (not illustrated) shifts a first reading unit 102 from a position X1 to a position X2. The first reading unit 102 scans the document P101 placed on the platen glass 101. In the second reading mode, a separation roller 105 continuously separates sheets of the document P102 stacked on the tray 103 and feeds separated sheets one by one to a first feed roller pair 107. A second feed roller pair 108 can receive a document sheet from the first feed roller pair 107 and carry the sheet to a discharge tray 104. A second reading unit 120 fixed in a document carrying section and the first reading unit 102 stopped at a home position can scan both a reverse surface and a front surface of the carried document sheet.

More specifically, according to the second reading mode, the separation roller 105 and a separating pad 106 can separate one sheet (i.e., the lowest sheet) from the stacked document P102. The first feed roller pair 107 carries a separated sheet. The second reading unit 120 reads an image of a reverse surface (i.e., upper surface) of the carried document sheet. The first reading unit 102 stopped at the position X1 reads an image of a front surface (i.e., lower surface) of the document sheet.

The document sheet P102 is discharged to the discharge tray 104 by the second feed roller pair 108 after their front and reverse images have been read. Then, the separation roller 105 and the separating pad 106 separate the next sheet of the document P102. The first feed roller pair 107 carries the next sheet. The first reading unit 102 and the second reading unit 120 read front and reverse surface images of the carried document sheet. This kind of conventional image reading apparatus is discussed in Japanese Patent Application Laid-Open No. 11-27507.

The above-described conventional image scanner enables a user to flexibly use both the first reading mode (i.e., a mode for scanning a document placed on a platen glass) and the second reading mode (i.e., a mode for scanning a document stacked on the document feeder section) as mentioned above.

However, the apparatus body tends to become larger because of the mechanism required for realizing plural functions. When the first reading mode is selected to scan a photographic document or a large document (e.g., a map), a user is required to open and close a relatively heavy cover of an automatic document feeder (ADF) in which the separation roller and the feed roller pairs are provided. The work for opening and closing the cover is not convenient for a user.

SUMMARY OF THE INVENTION

The present invention is directed to an image reading apparatus that can operate in a reading mode for continuously reading stacked document sheets and in another reading mode for reading a book or a large document. The image reading apparatus enables a user to select one of plural modes so as to improve portability and usability.

According to an aspect of the present invention, an image reading apparatus includes a first unit that has a first housing and a transparent platen on which a first document can be placed and a second unit that has a second housing having a bottom portion placed on an installation surface of the image reading apparatus. The first unit includes a first reading section configured to scan the first document; a scan driving section configured to shift the first reading section along the transparent platen; and a first control section configured to control the first reading section and the scan driving section. The second unit includes a positioning section configured to determine a position of the first unit; a document carrying section configured to carry a second document; and a second control section configured to control the document carrying section. The first unit is detachable from the second unit. The first reading section reads, through the transparent platen, a front surface of the second document carried by the document carrying section in a condition where the first unit is attached to the second unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Figure 1:
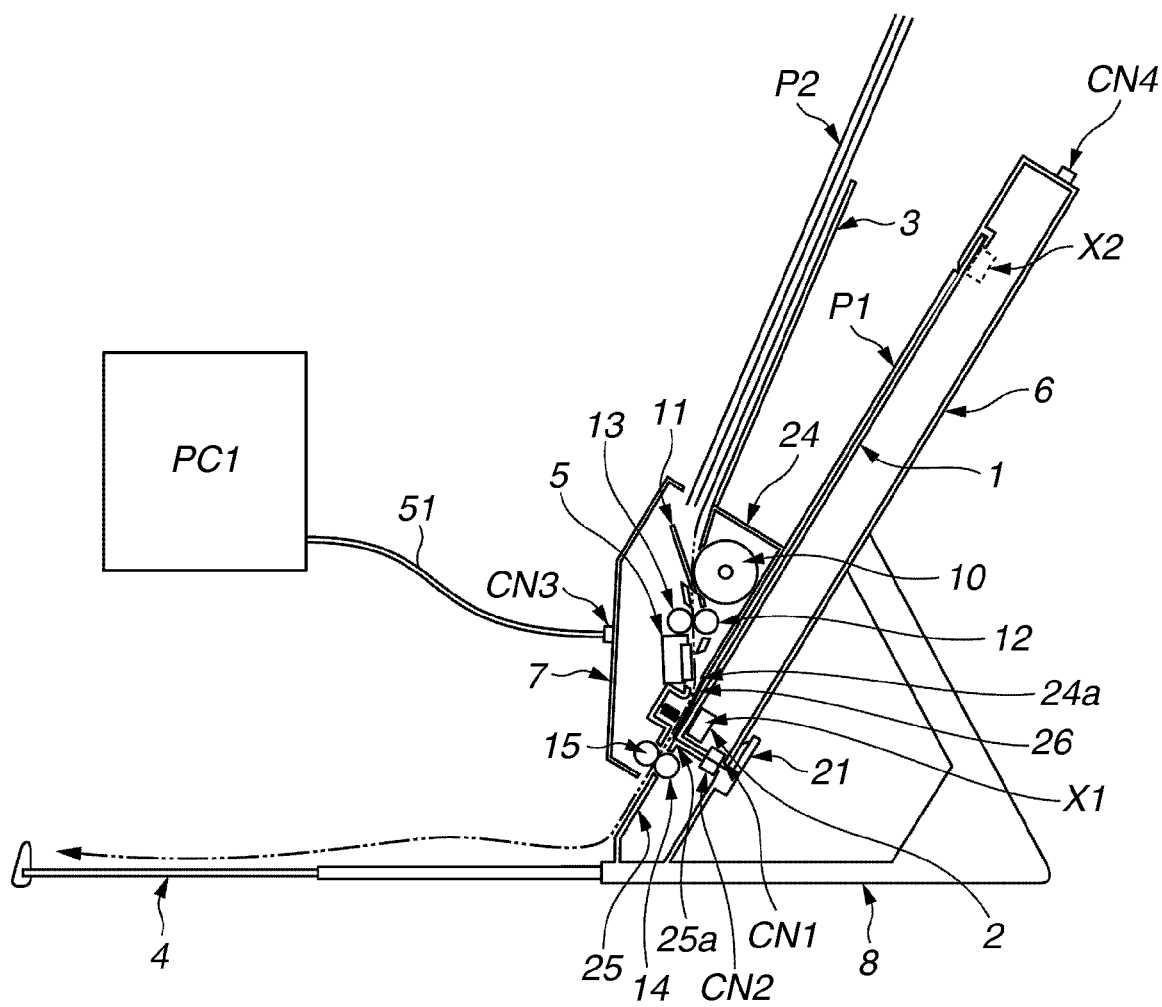
FIG. 1 is a vertical cross-sectional diagram illustrating an image reading apparatus according to a first exemplary embodiment of the present invention.

The following description of exemplary embodiments is merely illustrative in nature and is in no way intended to limit the invention, its application, or uses.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

An exemplary embodiment of the present invention will be described with reference to the attached drawings. FIG. 1 is a vertical cross-sectional diagram illustrating an image reading apparatus according to a first exemplary embodiment of the present invention.

The image reading apparatus according to the present embodiment can operate in a first reading mode for shifting a first reading unit 2 along a platen glass 1 to scan an image surface of a document P1 placed upside down (i.e., with a front surface facing downward) on the platen glass 1. Furthermore, at a document feed-reading section 7, the image reading apparatus can operate in a second reading mode for causing a second reading unit 5 fixed in a carrying section and the first reading unit 2 to scan both front and reverse surfaces of a document P2 carried from a document feeder tray 3 to a discharge tray 4.

Moreover, at the document feed-reading section 7, the image reading apparatus can operate in a third reading mode for causing the second reading unit 5 fixed in the carrying section to scan only a reverse surface of the document P2 carried from the document feeder tray 3 to the discharge tray 4.

FIG. 1 illustrates the image reading apparatus performing an image reading operation in the second reading mode. The image reading apparatus illustrated in FIG. 1 includes a flatbed reading section 6 operable in the first reading mode and the document feed-reading section 7 operable in the second reading mode. The flatbed reading section 6 includes the platen glass 1 and the first reading unit 2. The document feed-reading section 7 includes the document feeder tray 3 and the second reading unit 5.

The document feed-reading section 7 is fixed on a stand 8 that serves as a bottom portion stably placed on an installation surface. In the following description, the document feed-reading section 7 and the stand 8 are collectively referred to as an "apparatus body."

The apparatus body includes a positioning section 21 having a U-shaped cross section for positioning the flatbed reading section 6. The flatbed reading section 6 is attachable to and detachable from the apparatus body which includes the document feed-reading section 7.

The flatbed reading section 6 and the apparatus body are connected via connectors CN1 and CN2 that can transmit/receive image reading signals and control signals and can supply electric power. The connector CN1 is positioned at an end portion of the flatbed reading section 6. The connector CN2 is provided at a bottom portion of the positioning section 21 of the apparatus body. When the flatbed reading section 6 is engaged with the apparatus body, the connector CN2 can be coupled with the connector CN1.

In the exemplary embodiment, an assembly of the flatbed reading section 6 and the document feed-reading section 7 is obliquely supported by the stand 8. Thus, the platen glass 1 extends obliquely. However, the platen glass 1 can be held at an arbitrary angle (including a horizontal angle and a vertical angle).

The document feed-reading section 7 includes a separating/carrying mechanism for separating sheets of the document P2 stacked on the document feeder tray 3 and carrying the separated sheets one by one to the discharge tray 4.

More specifically, a separation roller 10 and a separating pad 11 are provided near an outlet of the document feeder tray 3 to continuously separate and feed the sheets of the document P2. The separation roller 10 can be a rubber roller and the separating pad can be a rubber sheet, which are pressed to each other. A driving unit (not illustrated) rotates the separation roller 10.

The separation roller 10, when driven, feeds only one sheet of the stacked document P2, while the separating pad 11 prevents the remaining sheets of the stacked document P2 from being carried together with the carried sheet.

A first feed roller pair (12, 13), disposed at a downstream side of the separation roller 10, can carry a separated document sheet to the second reading unit 5. The second reading unit 5, disposed at a downstream side of the first feed roller pair (12, 13), reads an image of a reverse surface (i.e., an upper surface) of the document sheet.

The second reading unit 5 includes a light emitting diode (LED) serving as a light source and a contact image sensor (CIS) including a rod lens and a linear image sensor. Alternatively, the second reading unit 5 can be any other optical device such as a reducing optical system including a cold-cathode tube serving as a light source, plural folding mirrors, an imaging lens, and a CCD line sensor. A second feed roller pair (14, 15), disposed at a downstream side of the second reading unit 5, can carry the document sheet to the discharge tray 4.

According to the above mentioned arrangement, sheets of the document P2 can be separated one by one from the document feeder tray 3 and continuously carried to the reading positions of the second reading unit 5 and the first reading unit 2. In this case, the reading units 5 and 2 can read two-sided (i.e., front and reverse) images of each document sheet.

The flatbed reading section 6 includes the platen glass 1 and the first reading unit 2 assembled in a frame housing. In the first reading mode illustrated in FIG. 3, the document sheet P1 is placed upside down (i.e., with a front surface (surface to be read) facing downward) on the platen glass 1. A driving unit (not illustrated) drives the first reading unit 2 along a lower side of the platen glass 1 from the position X1 to the position X2. The first reading unit 2 scans the document P1 and reads a front surface image of the document P1.

The flatbed reading section 6 includes a driving mechanism and a control circuit that controls the flatbed reading section 6. FIG. 1 illustrates the flatbed reading section 6 connected to the apparatus body (7 and 8) in a condition where a platen cover 23 is detached. The second reading unit 5 of the document feed-reading section 7 is disposed at an opposite side of the first reading unit 2 of the flatbed reading section 6 relative to the document.

Similar to the second reading unit 5, the first reading unit 2 includes a light emitting diode (LED) serving as a light source and a contact image sensor (CIS) that includes a rod lens and a linear image sensor. Alternatively, the first reading unit 2 can be any other optical device such as a reducing optical system including a cold-cathode tube serving as a light source, plural folding mirrors, an imaging lens, and a CCD line sensor.

The apparatus body includes a connector CN3 connectable via a USB cable 51 to a computer PC1. The computer PC1 can control the apparatus body. In the exemplary embodiment, the apparatus body having the document feed-reading section 7 includes an alternating current (AC) adapter.

In a condition where the flatbed reading section 6 is engaged with the apparatus body, electric power is supplied via the AC adapter to the document feed-reading section 7 and the flatbed reading section 6.

The control section of the apparatus body, controlling the first reading unit 2 and the second reading unit 5, communicates with the personal computer PC1 via the USB cable 51 connected to the connector CN3 of the document feed-reading section 7.

Figure 2:
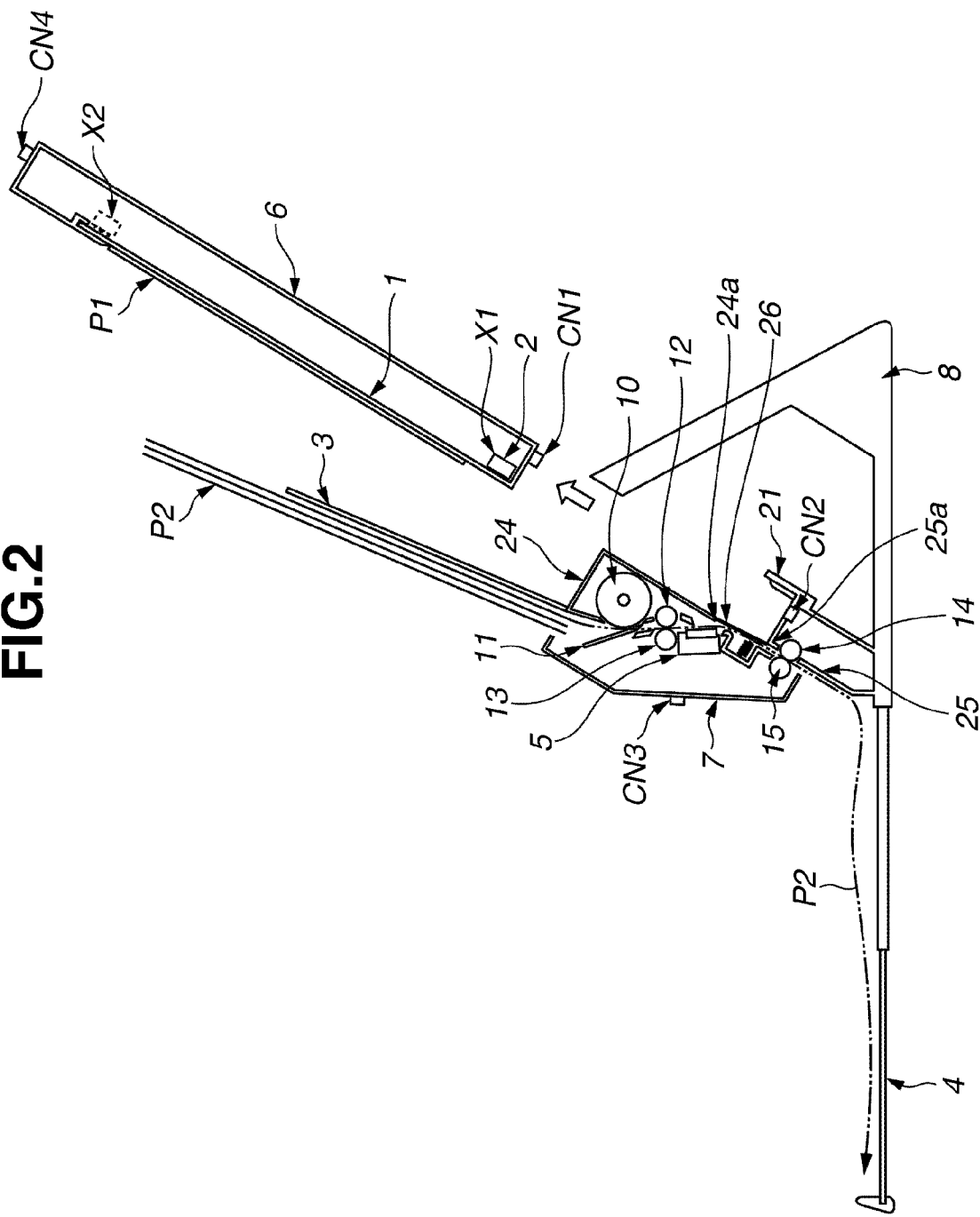
FIG. 2 is a vertical cross-sectional diagram illustrating a flatbed reading section attachable to or detachable from the image reading apparatus illustrated in FIG. 1.
Figure 3:
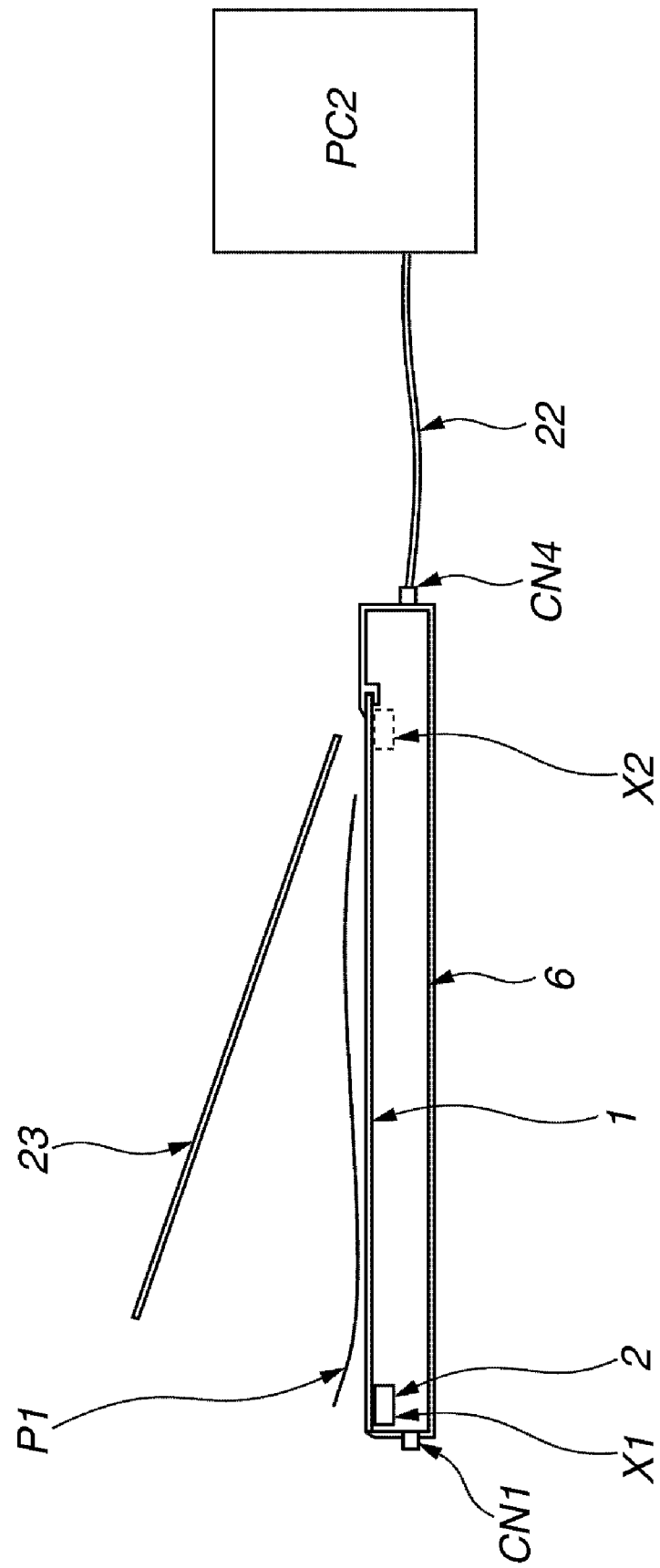
FIG. 3 a vertical cross-sectional diagram illustrating the flatbed reading section detached from the image reading apparatus and used as a flatbed scanner.
Figure 4:
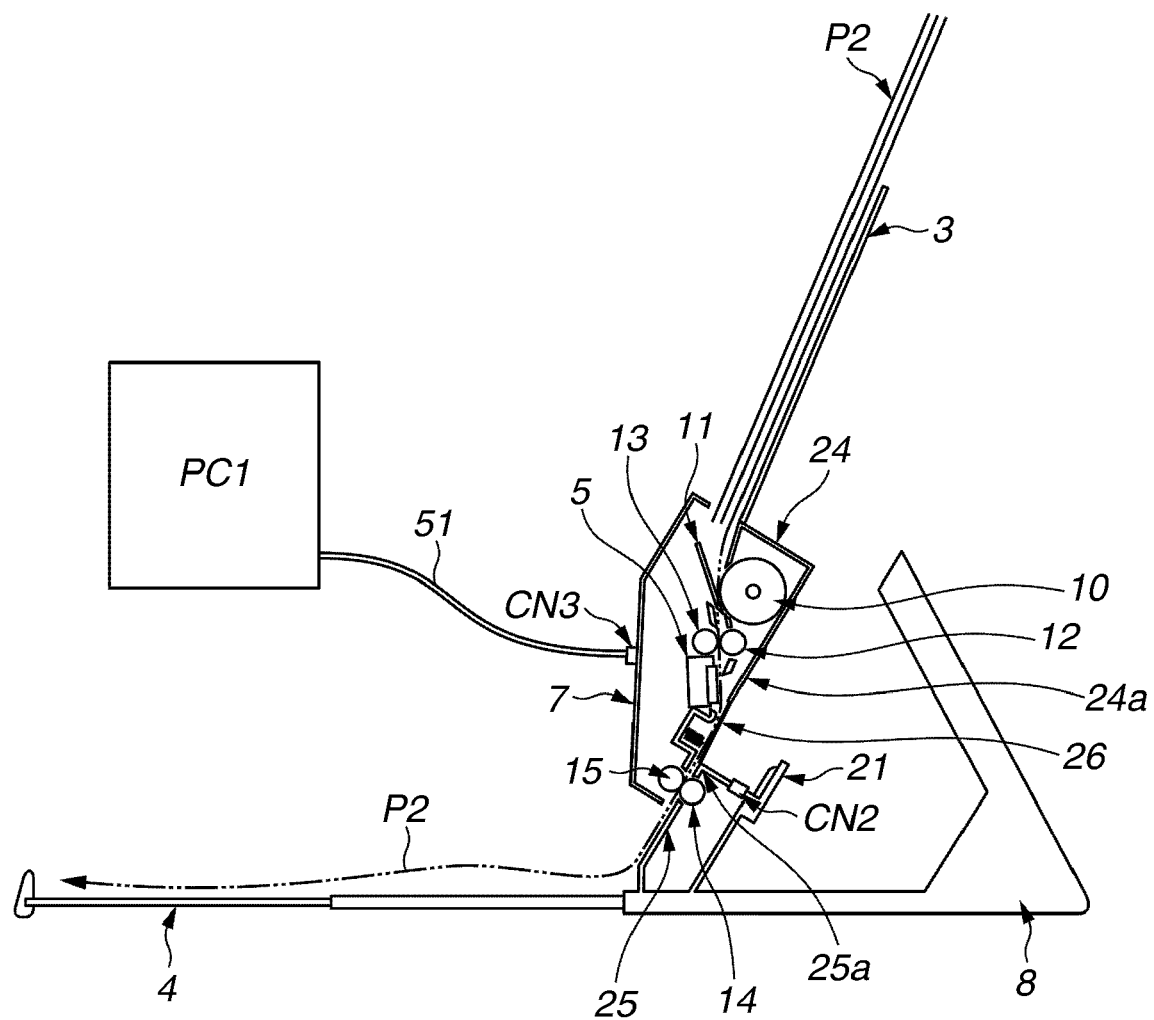
FIG. 4 is a vertical cross-sectional diagram illustrating the image reading apparatus illustrated in FIG. 1 in a condition where the flatbed reading section is detached from an apparatus body.

FIG. 2 is a vertical cross-sectional diagram illustrating the flatbed reading section 6 detached from the image reading apparatus illustrated in FIG. 1. FIG. 3 is a vertical cross-sectional diagram illustrating the flatbed reading section 6 which is detached from the image reading apparatus illustrated in FIG. 1 and used as a flatbed scanner at a different place. FIG. 4 is a vertical cross-sectional diagram illustrating the image reading apparatus in a condition where the flatbed reading section 6 is detached from the apparatus body illustrated in FIG. 1.

In FIGS. 2 through 4, the image reading apparatus according to the present embodiment includes the flatbed reading section 6 detachable from the apparatus body (or the document feed-reading section 7) having the first reading unit 2 (refer to FIG. 2). The detached flatbed reading section 6 is a portable unit that a user can use at other places.

As illustrated in FIG. 3, the flatbed reading section 6 has a USB terminal CN4. A user can connect the USB terminal CN4 of the detached flatbed reading section 6 via a USB cable 22 to another computer PC2. In this case, the computer PC2 supplies electric power via the USB terminal CN4 to drive the flatbed reading section 6 separated from the apparatus body. In short, the detached flatbed reading section 6 can be independently used as a flatbed scanner at a different place.

On the other hand, in the third reading mode which is later described, the flatbed reading section 6 is detached from the apparatus body. As illustrated in FIGS. 4 through 7, the second reading unit 5 can read a one-sided (reverse surface) image of each sheet of the document P2 carried from the document feeder tray 3.

Figure 5:
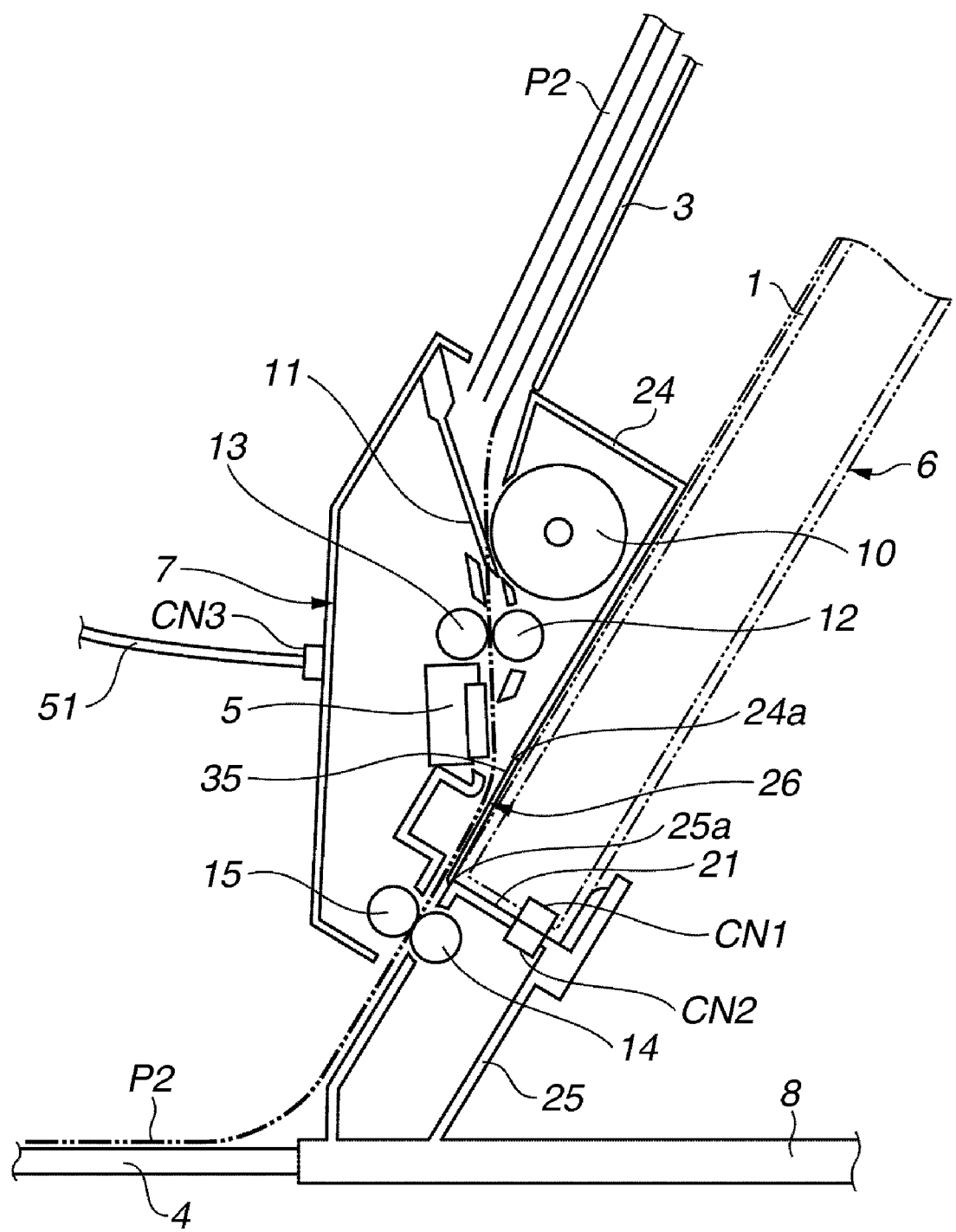
FIG. 5 is an enlarged vertical cross-sectional diagram illustrating a document guide member in a document feed-reading section of the image reading apparatus illustrated in FIG. 1.

FIG. 5 is an enlarged vertical cross-sectional diagram illustrating a document guide member 26, provided in the document feed-reading section 7 of the image reading apparatus illustrated in FIG. 1. The document guide member 26 serves as an anti-fall member.

In FIG. 5, the document feed-reading section 7 has a lower cover 24. A housing 25 supports the second feed roller pair (14, 15). To read an image of a lower surface (front surface) of a sheet of the document P2, an aperture 35 is defined between a lower end portion 24*a* of the lower cover 24 and an upper end portion 25*a* of the housing 25.

More specifically, when the first reading unit 2 is stopped at the X1 position, the aperture 35 enables the first reading unit 2 to scan a document sheet in a condition where the flatbed reading section 6 is attached to the apparatus body. The aperture 35 is a part of the carrying path for carrying a sheet of the document P2.

In the present embodiment, the aperture 35 is closed by the document guide member 26, such as a transparent plastic sheet fixed to the lower cover 24 and the housing 25. The plastic sheet 26 (i.e., the document guide member) functions as a document anti-fall member that can prevent a sheet of the document P2 from falling through the aperture 35 when the second reading unit 5 scans a document sheet in a condition where the flatbed reading section 6 is detached from the apparatus body.

An exemplary action of the image reading apparatus according to the present embodiment is described with reference to FIGS. 1 through 5. For example, a user may select the second reading mode (refer to FIG. 1) to scan plural printout sheets of a document, or separated pages of a book or a magazine. In this case, a user sets sheets of the document P2 on the document feeder tray 3. Then, the user instructs the computer PC1 to start a document reading operation.

In response to an instruction supplied from the computer PC1, the separation roller 10 of the document feed-reading section 7 starts rotating to feed the lowest sheet of the document P2 stacked on the document feeder tray 3 to the first feed roller pair (12, 13). The first feed roller pair (12, 13) carries a document sheet to a reading position of the second reading unit 5. The second reading unit 5 reads an image of a reverse surface (i.e., upper surface) of the document sheet.

Next, the document sheet P is carried to a reading position of the first reading unit 2 stopped at the position X1. The first reading unit 2 reads, through the transparent platen glass 1, an image of a front surface (i.e., lower surface) of the document sheet P2. In this case, the stop position X1 of the first reading unit 2 corresponds to a lower end of the platen glass 1. The document sheet P2, having passed through the first reading unit 2, is then carried by the second feed roller pair (14, 15) and discharged to the discharge tray 4.

The image reading apparatus according to the present embodiment repeats the above mentioned action to completely scan all sheets of the document P2 stacked on the document feeder tray 3 and terminates the image reading action. Through the above-described action, the image reading apparatus can continuously read two-sided images of each sheet of the document P2 fed from the document feeder tray 3. In the exemplary embodiment, as illustrated, a document sheet is carried from the document feeder tray 3 and passes near the platen glass 1. Accordingly, the second reading unit 5 and the first reading unit 2 can easily form a two-sided reading mechanism.

The document to be scanned may be a book, a magazine having a significant thickness, a newspaper wider than the platen glass, a printed photograph, or a delicate document which may be damaged by a roller. In such a case, a user usually selects the first reading mode. In the first reading mode, a user detaches the flatbed reading section 6 from the apparatus body as illustrated in FIGS. 2 and 3.

Then, the user connects the USB terminal CN4 of the flatbed reading section 6 to another computer PC2 via the USB cable 22. Subsequently, the user places the document P1 on the platen glass 1 and closes the platen cover 23. The user instructs the computer PC2 to start a document reading operation. The driving unit (not illustrated) shifts the first reading unit 2 from the position X1 to the position X2. The first reading unit 2 scans a front surface of the document P1 and reads a front surface image of the document P1.

The computer PC2 supplies electric power to the flatbed reading section 6 via the USB cable 22 connected to the USB terminal CN4. NO other power source cord or AC adapter is required. When the connector CN1 is a USB connector, the flatbed reading section 6 can be connected to an external computer via the connector CN1.

According to the present embodiment, as illustrated in FIG. 4, in a condition where the flatbed reading section 6 is detached from the apparatus body, the image reading apparatus can perform an image reading operation according to the third reading mode. In this case, a user places sheets of the document P2 on the document feeder tray 3 so that a reading surface faces upward.

When a user instructs the computer PC1 to start a document reading operation, the computer PC1 causes the separation roller 10 of the document feed-reading section 7 to start rotating and feed the lowest sheet of the document P2 stacked on the document feeder tray 3 to the first feed roller pair (12, 13). The first feed roller pair (12, 13) carries the document sheet to the reading position of the second reading unit 5. The second reading unit 5 reads an image of the document sheet.

In this case, as illustrated in FIG. 5, the aperture 35 is present between the lower end portion (downstream end portion) 24a of the lower cover 24 of the document feed-reading section 7 and the upper end portion (upstream end portion) 25a of the housing 25 of the second feed roller pair (14, 15).

As described above, the aperture 35 is closed by the transparent plastic sheet 26. The plastic sheet 26 (i.e., the document guide member) functions as a document anti-fall member that can prevent a document sheet from falling through the aperture 35.

Therefore, in a condition where the flatbed reading section 6 is detached from the apparatus body, a sheet of the document P2 can be fed from the document feeder tray 3, and a leading end of the document sheet can be stably guided along the carrying path without falling from a clearance or opening formed when the platen glass 1 is removed or without causing any paper jams.

Accordingly, the second reading unit 5 can scan the document sheet and read a document image when the document sheet is carried along the transparent plastic sheet 26. The leading end of the document sheet P2 is stably guided along the upper surface of the transparent plastic sheet 26 and enters a clearance between the second feed roller pair (14, 15). Subsequently, the document sheet can be stably carried by the second feed roller pair (14, 15) and discharged to the discharge tray 4.

The image reading apparatus according to the present embodiment repeats the above mentioned action to completely scan all sheets of the document P2 stacked on the document feeder tray 3 and terminates a sequential image reading action. The image reading apparatus operates in the third reading mode in a condition in which the flatbed reading section 6 is detached from the apparatus body. The second reading unit 5 can read a one-sided (upper surface) image of a sheet of the document P2 (not two-sided images of the document).

According to the above-described exemplary embodiment, an image reading apparatus can flexibly operate in the first reading mode, the second reading mode, and the third reading mode. In the first reading mode, the flatbed reading section 6 is detached from the apparatus body. The first reading unit 2 scans the document P1 to read a one-sided image of the document P1.

In the second reading mode, the flatbed reading section 6 is attached to the apparatus body. The second reading unit 5 of the document feed-reading section 7 and the first reading unit 2 of the flatbed reading section 6 continuously read two-sided (i.e., front and reverse) images of each sheet of the document P2. In the third reading mode, the flatbed reading section 6 is detached from the image reading apparatus. The second reading unit 5 of the document feed-reading section 7 continuously reads one-sided image of each sheet of the document P2.

Furthermore, the detached flatbed reading section 6 and the apparatus body (i.e., the image reading apparatus separated from the flatbed reading section 6) can independently function as a portable image reader. Thus, the present embodiment can greatly improve the usability of the image reading apparatus.

Second Exemplary Embodiment

Figure 6:
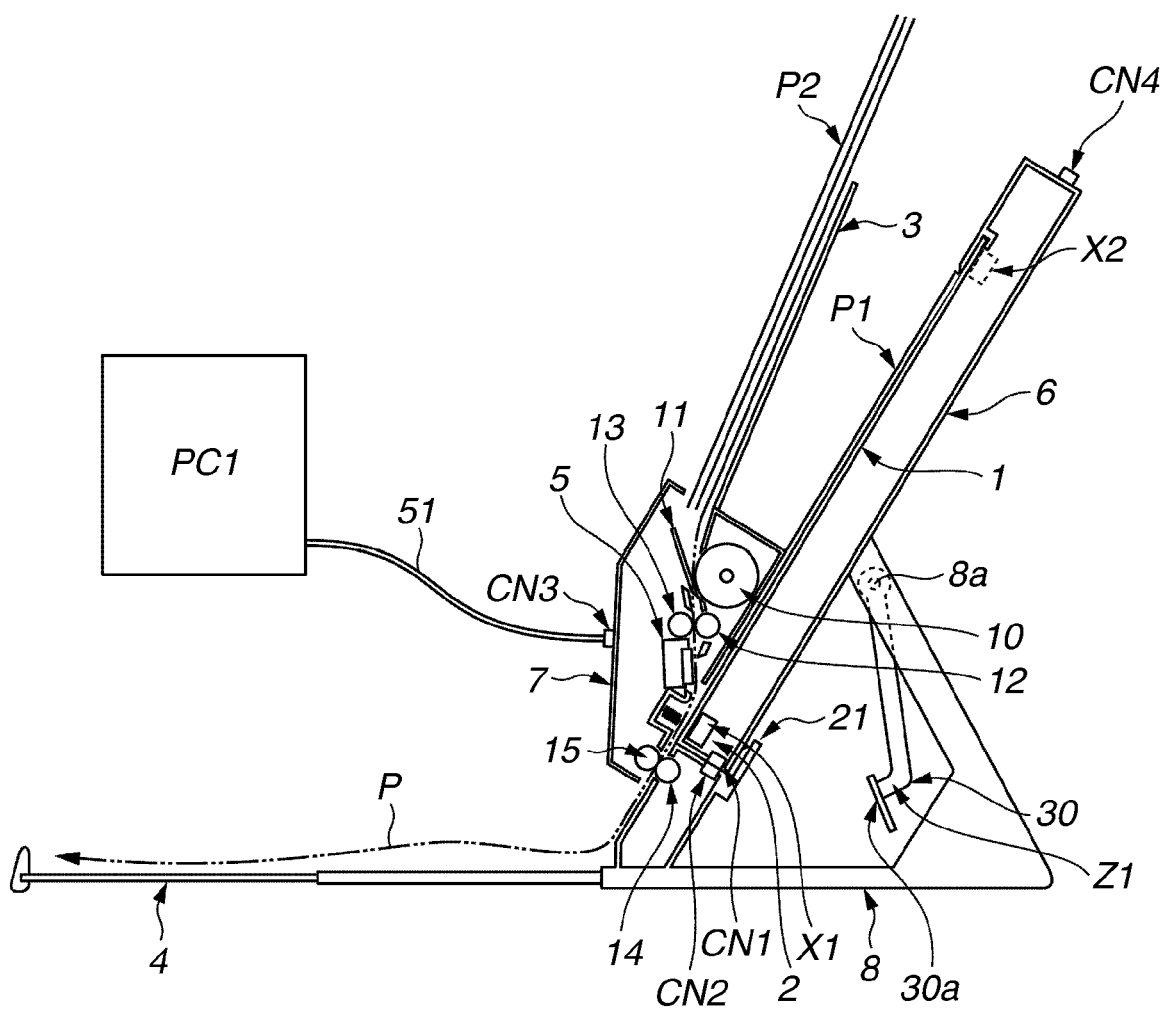
FIG. 6 is a vertical cross-sectional diagram illustrating an image reading apparatus according to a second exemplary embodiment of the present invention.
Figure 7:
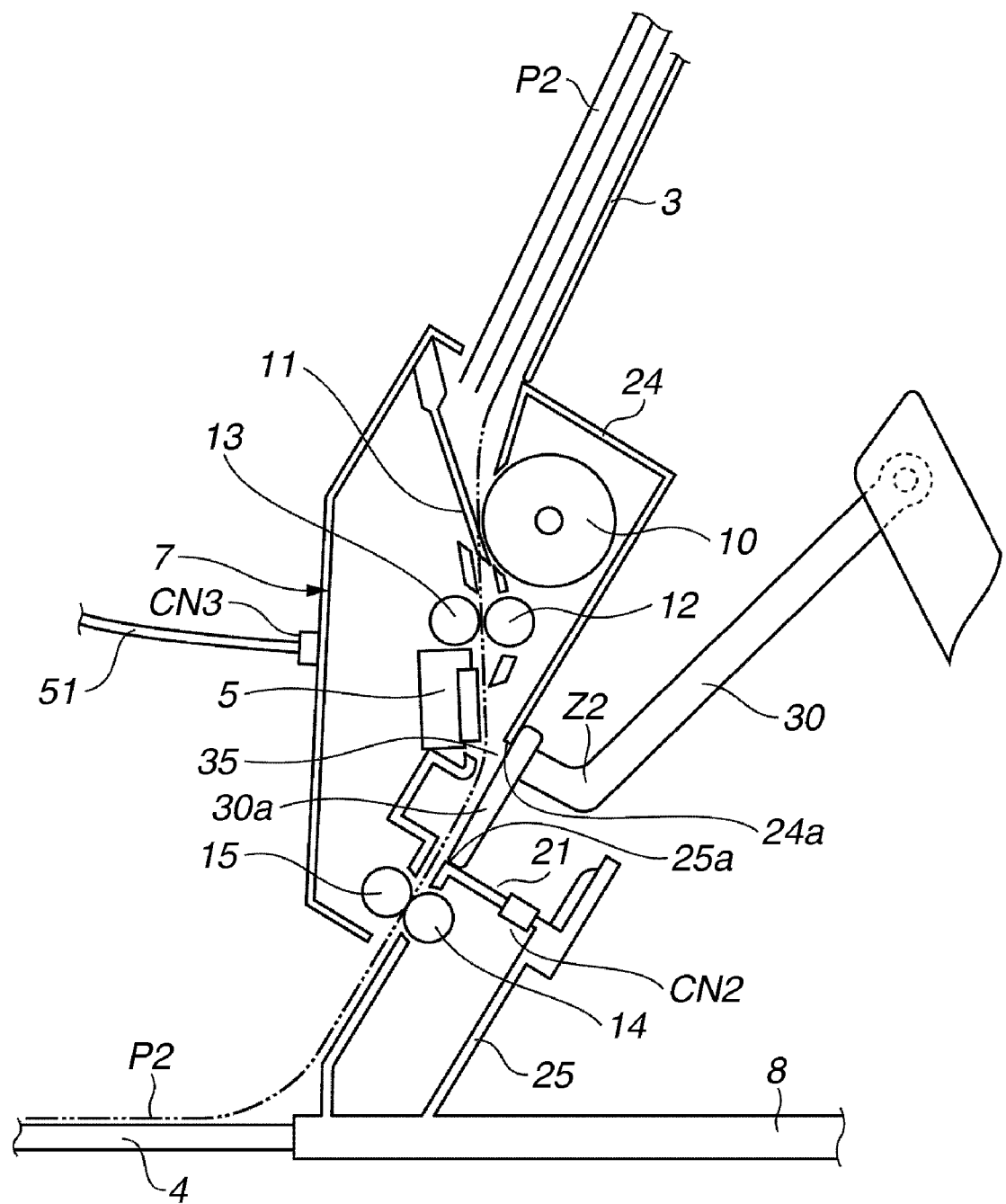
FIG. 7 is an enlarged vertical cross-sectional diagram illustrating a document guide member set in a document feed-reading section of the image reading apparatus illustrated in FIG. 6.
Figure 8:
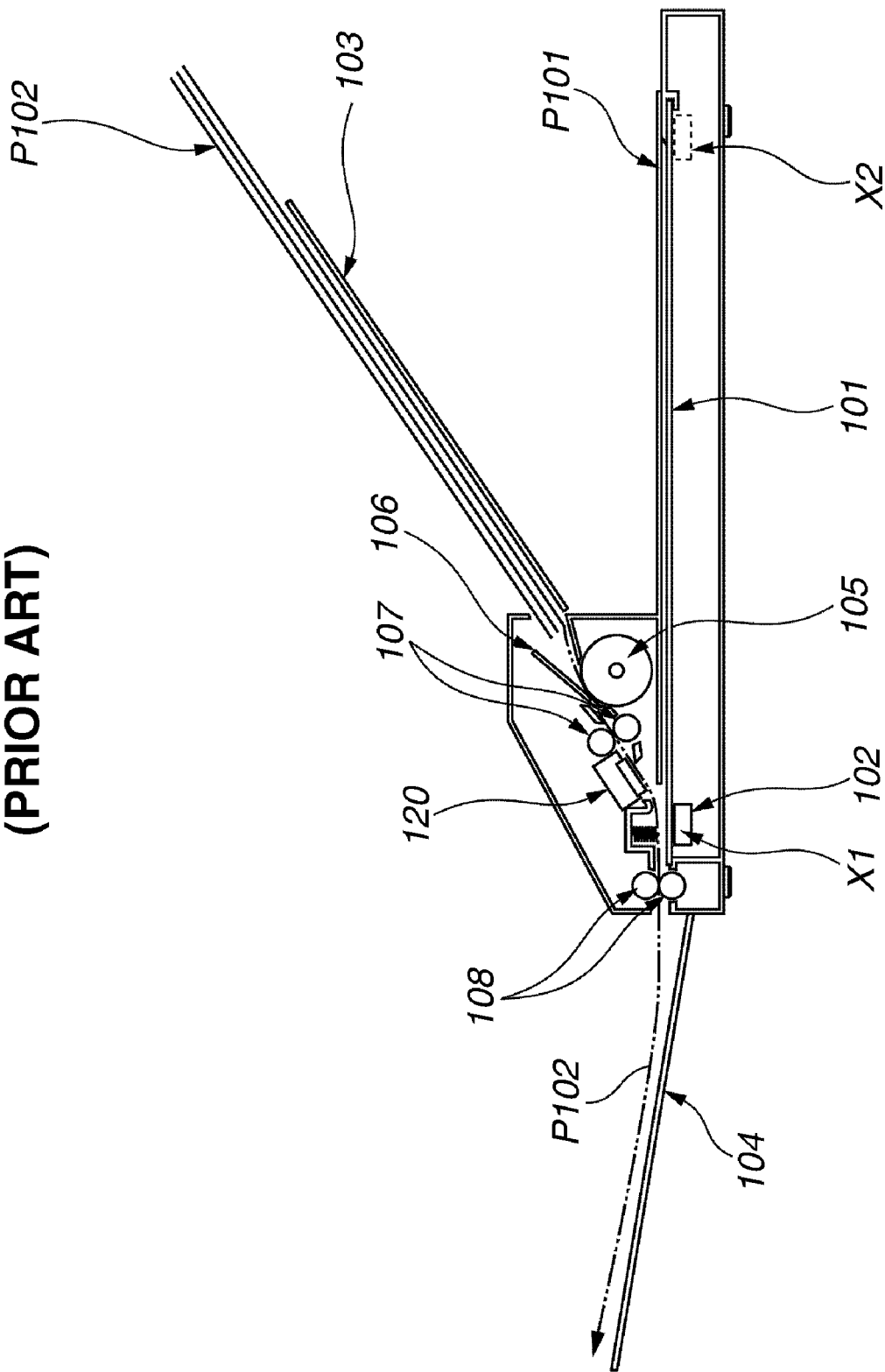
FIG. 8 is a vertical cross-sectional diagram illustrating a conventional image reading apparatus.

FIG. 6 is a vertical cross-sectional diagram illustrating an image reading apparatus according to a second exemplary embodiment of the present invention. FIG. 7 is an enlarged vertical cross-sectional diagram illustrating a document guide member 30 positioned at an operative position Z2. The document guide member 30 is provided in the document feed-reading section 7 of the image reading apparatus illustrated in FIG. 6.

FIGS. 6 and 7 illustrate members similar, in arrangement and function, to those illustrated in FIGS. 1 through 5 and denoted by the same reference numerals.

The above-described first exemplary embodiment uses the plastic sheet 26 (i.e., the transparent document guide member) functioning as an anti-fall member capable of preventing a document sheet from falling.

The second exemplary embodiment uses the document guide member 30 having a movable flat face portion 30a. The flat face portion 30a can be positioned to close an opened portion which is formed when the flatbed reading section 6 is detached from the apparatus body. The opened portion corresponds to the platen glass 1 of the flatbed reading section. The flat face portion 30a can form a part of the carrying path for carrying a document sheet.

In FIGS. 6 and 7, the document guide member 30 is a lever member having a flat face portion 30a provided at its distal end. The document guide member 30 can swing about a pivot 8a of the stand 8 between the inoperative position (Z1 illustrated in FIG. 6) and an operative position (Z2 illustrated in FIG. 7) where the document guide member 30 can be positioned and held.

An exemplary positioning/holding unit for the document guide member 30 can be a mechanical type including a spring-engaging mechanism or a ball latch mechanism, or can be a magnetic type or any other conventional mechanism. When the flatbed reading section 6 is attached to the apparatus body, as illustrated in FIG. 6, the document guide member 30 is held at the inoperative position Z1 where the document guide member 30 does not interfere with the flatbed reading section 6.

When a user operates the apparatus body separated from the flatbed reading section 6, the user can move the document guide member 30 from the inoperative position Z1 to the operative position Z2. Thus, the document guide member 30 is positioned and held at the operative position Z2 as illustrated in FIG. 7. At the operative position Z2 (i.e., an anti-fall position), the flat face portion 30a of the document guide member 30 is set to a position corresponding to the platen glass 1 in the condition where the flatbed reading section 6 is attached to the apparatus body.

In short, the flat face portion 30a can close the aperture 35 between the lower end portion 24a of the lower cover 24 of the document feed-reading section 7 and the upper end portion 25a of the housing 25 of the second feed roller pair (14, 15). The flat face portion 30a can form a part of the carrying path for carrying a sheet of document P2.

Thus, similar to the above mentioned transparent plastic sheet 26, the flat face portion 30a can function as an anti-fall unit capable of preventing a sheet of the document P2 from falling through the aperture 35. Therefore, even in a condition where the flatbed reading section 6 is detached from the apparatus body, a sheet of the document P2 can be fed from the document feeder tray 3, and a leading end of the document sheet can be stably guided along the carrying path without falling through the opening formed when the platen glass 1 is removed.

The second exemplary embodiment illustrated in FIGS. 6 and 7 is similar to the first exemplary embodiment illustrated in FIGS. 1 through 5 but the above-described anti-fall mechanism.

Similar to the first exemplary embodiment, the second exemplary embodiment can form substantially the same carrying path by moving the document guide member 30 to the operative position Z2 when the flatbed reading section 6 is detached from the apparatus body.

Accordingly, when the image reading apparatus continuously carries and scans sheets of the document P2 in a condition where the flatbed reading section 6 is detached from the apparatus body, the sheets of the document P2 can be stably carried along the predetermined carrying path without causing any paper jams.

Therefore, similar to the first exemplary embodiment, the second exemplary embodiment can provide an image reading apparatus which is flexibly operable in the first reading mode, the second reading mode, and the third reading mode.

Moreover, the detached flatbed reading section 6 and the apparatus body (i.e., the image reading apparatus separated from the flatbed reading section 6) can independently function as a portable image reader. Thus, the present embodiment can greatly improve the portability and usability of the image reading apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-067420 filed Mar. 13, 2006 and Japanese Patent Application No. 2006-115696 filed Apr. 19, 2006, which are hereby incorporated by reference herein in their entirety.

What is claimed is:

1. An image reading apparatus comprising:
   a first unit including a first housing and a transparent platen on which a first document can be placed; and
   a second unit including a second housing having a bottom portion that is an installation surface of the image reading apparatus, wherein
   the first unit includes:
      a first reading section configured to scan the first document;
      a scan driving section configured to shift the first reading section along the transparent platen; and
      a first control section configured to control the first reading section and the scan driving section;
   the second unit includes:
      a positioning section configured to determine a position of the first unit when attached thereto;
      a document carrying section configured to carry a second document; and
      a second control section configured to control the document carrying section,
   wherein the first unit is detachable from the second unit, and
   wherein the first reading section reads, through the transparent platen, a front surface of the second document being carried by the document carrying section in a condition where the first unit is attached to the second unit.

2. The image reading apparatus according to claim 1, wherein the second unit includes a second reading section configured to read a reverse surface of the second document carried by the document carrying section.

3. The image reading apparatus according to claim 2, wherein in a condition where the first unit is attached to the second unit, the first reading section reads, through the transparent platen, the front surface of the second document carried by the document carrying section, and the second reading section reads the reverse surface of the second document carried by the document carrying section.

4. The image reading apparatus according to claim 1, wherein the first unit is mounted on the second unit in the condition where the first unit is attached to the second unit.

5. The image reading apparatus according to claim 1, wherein the first unit includes a first electric connector connecting an external device and the first control section, wherein the second unit includes a second electric connector connected to the first electric connector, and the second unit supplies electric power to the first unit via the first and second electric connectors in a condition where the first unit is attached to the second unit.

6. The image reading apparatus according to claim 5, wherein the first electric connector is disposed at an end portion of the first housing, and the second electric connector is disposed at the bottom portion of the second housing of the second unit.

7. The image reading apparatus according to claim 5, wherein the second unit includes a third electric connector, wherein the second unit transmits signals representing images of front and reverse surfaces of the second document carried by the document carrying section via the third electric connector to an external apparatus.

8. The image reading apparatus according to claim 1, wherein the first unit is capable of acting as an independent flatbed scanner when the first unit is detached from the second unit, wherein the first unit includes a fourth electric connector through which the signal representing an image of the first document is transmitted to an external apparatus.

9. The image reading apparatus according to claim 4, wherein the first unit is capable of acting as an independent flatbed scanner when the first unit is detached from the second unit, wherein the first unit transmits the signal representing an image of the first document via the first electric connector to an external apparatus.

10. The image reading apparatus according to claim 1, wherein the second unit includes a document feeder section, and wherein the document carrying section carries the second document one by one from the document feeder section to the first reading section.

11. The image reading apparatus according to claim 2, wherein the second unit is capable of acting as an independent sheet feed scanner in a condition where the first unit is detached from the second unit, and wherein the second unit includes a document guide disposed along a carrying path of the second document carried by the document carrying section.

12. The image reading apparatus according to claim 11, wherein the document guide includes a transparent sheet.

13. The image reading apparatus according to claim 11, wherein the document guide is movable from an operative position where the document guide forms a part of the carrying path for carrying the second document to an inoperative position where the document guide does not interfere with the first unit in a condition where the first unit is attached to the second unit.

* * * * *